United States Patent [19]

Shinomura

[11] 4,197,148

[45] Apr. 8, 1980

[54] PROCESS FOR PRODUCING A PERMEABLE MEMBRANE

[75] Inventor: Toshihiko Shinomura, Yokohama, Japan

[73] Assignee: Nippon Oil Co., Ltd., Tokyo, Japan

[21] Appl. No.: 847,065

[22] Filed: Oct. 28, 1977

[30] Foreign Application Priority Data

Dec. 10, 1976 [JP] Japan .................... 51-147669

[51] Int. Cl.$^2$ .................... B29H 7/20; B29D 7/22
[52] U.S. Cl. .................... 156/79; 156/244.24; 156/244.27; 210/500 M; 264/49; 264/171; 264/288.8; 264/234; 264/345; 264/210.6
[58] Field of Search .................... 264/95, 209, 171, 49, 264/234–235, 345–346; 210/500 M; 156/79, 244.24, 244.27, 78

[56] References Cited

U.S. PATENT DOCUMENTS

| 3,243,486 | 3/1966 | Pilaro | 264/95 |
|---|---|---|---|
| 3,382,305 | 5/1968 | Breen | 264/171 |
| 3,697,367 | 10/1972 | Schwarz | 264/171 |
| 3,770,537 | 11/1973 | Elton | 264/49 |
| 3,819,782 | 6/1974 | Irie | 264/49 |
| 3,840,625 | 10/1974 | Yamamoto et al. | 264/49 |
| 3,869,310 | 3/1975 | Fukushima et al. | 264/49 |

FOREIGN PATENT DOCUMENTS

1199566  7/1970  United Kingdom .................... 264/49

*Primary Examiner*—Jeffery R. Thurlow
*Attorney, Agent, or Firm*—Wenderoth, Lind & Ponack

[57] ABSTRACT

A process for preparing permeable membranes which comprises mixing in the molten state two different kinds of thermoplastic synthetic resins which are partly compatible with each other, shaping the molten mixture into a sheet- or film-like melt, passing the film- or sheet-like melt through a heated zone, cooling and solidifying it, the time from the shaping of the molten mixture into the film- or sheet-like melt to its cooling and solidification (melt maintenance time) being adjusted to 10 to 600 seconds, treating the resulting film or sheet with a solvent which is a good solvent for one of the component resins but is a poor solvent for the other to dissolve and remove the soluble resin, and drying the product. In place of the resin to be removed by the solvent, rubbers or oligomers having partial compatibility with the resin which remains undissolved can be used.

15 Claims, 1 Drawing Figure

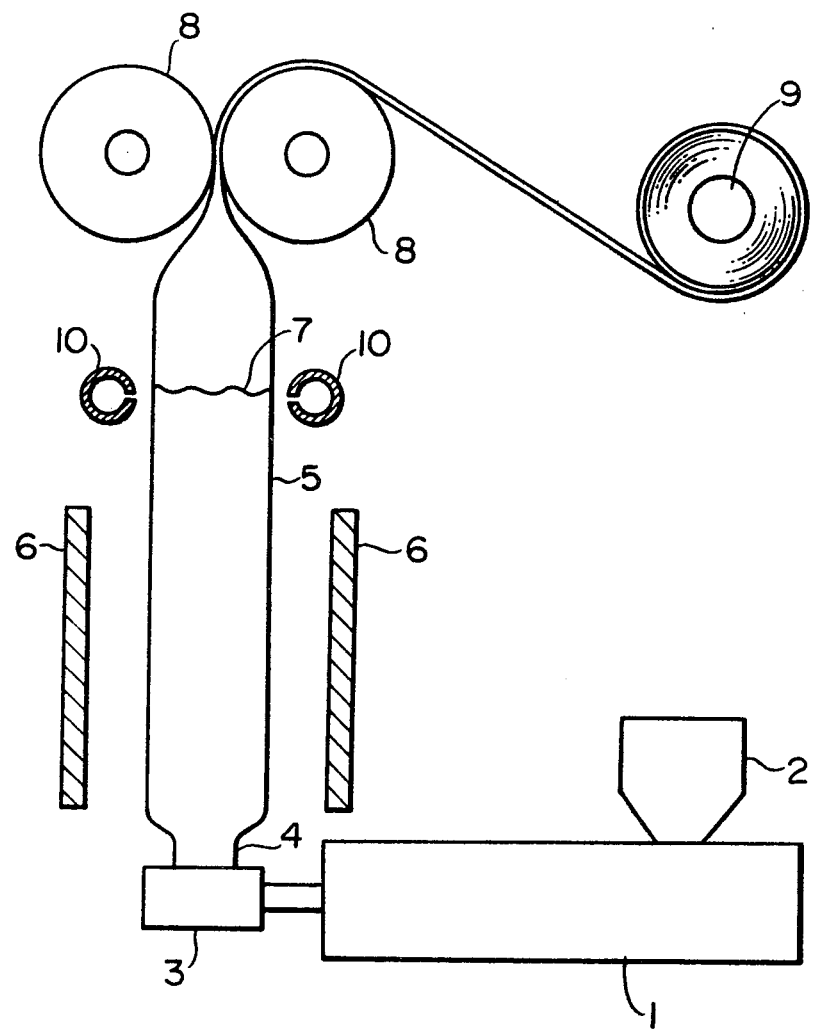

PROCESS FOR PRODUCING A PERMEABLE MEMBRANE

This invention relates to a process for producing a permeable membrane from a polymer having stretchability, especially a permselective membrane suitable for use as a reverse osmosis membrane, battery separator, microbe-free packaging material, filter, or the like.

Some methods for producing a permeable membrane using a polymer as a substrate have already been suggested. These methods include, for example, a process for preparing a reverse osmosis membrane by the wet method which comprises casting a solution of cellulose acetate or an aromatic polyamide, evaporating part of the solvent, placing the cast solution in a coagulating bath, and then annealing the resulting membrane [S. Loeb, S. Sourirajan, Report No. 60—60, Department of Engineering, University of California, Los Angeles (1960)], and a process for preparing a reverse osmosis membrane by the dry method which involves evaporating the solvent completely without using a coagulation process [R. E. Kesting, J. Appl. Polymer Sci., 17, 1771 (1973)].

Methods for producing porous membranes from polymers have already been proposed. They include, for example, a method which comprises mixing a tetrafluoroethylene resin powder with a liquid lubricant, extruding or rolling the mixture into a sheet, stretching the sheet, and sintering it by heating (Japanese Patent Publication No. 13560/67); a method which comprises causing the adsorption of a thermoplastic resin monomer to a tetrafluoroethylene resin powder, polymerizing the monomer, shaping the resulting polymeric particles at a temperature above the softening point of the thermoplastic resin, and removing the thermoplastic resin by a solvent while leaving the polytetrafluoroethylene undissolved (Japanese Patent Publication No. 12177/73); a method which comprises dissolving a synthetic resin in a mixture of a solvent and a nonsolvent, applying the resulting dispersion to a porous material, and drying it (Japanese Patent Publication No. 37710/75); and a method which comprises etching a polycarbonate film by irradiating neutron rays (Chemistry and Industry, 23, 1393, 1970).

Furthermore, a process for producing a microporous film by extruding a crystalline polyolefin, polyamide, polyester or polyoxymethylene into a film and heat-treating the resulting film has been known [H. S. Bierenbaum, R. B. Isaacson, M. L. Druin, S. G. Plovan, Industrial & Engineering Chemistry Product Research and Development, 13, 2 (1974)]. The microporous film has, to some extent, found applications as a battery separator, and in the medical field as a microbe-free packaging material for injection syringes and a barrier against bacteria.

These processes, however, are complicated in process steps, lend themselves to difficult control of pore sizes, and are costly. Moreover, the cellulose acetate membranes are susceptible to spoilage by micro-organisms.

Previously, the present inventors found that porous membranes which are free from the defects of the prior art, and have readily controllable pore sizes over a broad range and superior resistances to spoilage and to chemicals can be produced easily at low cost by a process which comprises shaping a molten mixture of (A) a specified polymer and (B) a specified compound into a film, sheet or hollow article in which the polymer (A) and the compound (B) are in the partly mutually dissolved state, treating the shaped article with a specified solvent which is a poor solvent for the polymer (A) and is a good solvent for the compound (B), drying the treated article, and then stretching it in one or two directions. This process was applied for a patent [Japanese Patent application No. 32956/75; corresponding to U.S. Pat. Ser. No. 669,450 (U.S. Pat. No. 4,100,238) and British Patent application No. 10937/76 (British Pat. No. 1,506,665)].

It is an object of this invention to provide a process which lends itself to an easy control of pore sizes, and which can afford permselective films having desired pore sizes over a wide range and superior resistances to spoilage and to chemicals.

The present inventors found that if in the process of the above cited prior application which involves shaping the molten mixture of polymer (A) and compound (B) into a film- or sheet-like melt through an extruding die, the film- or sheet-like melt is passed through a heated zone and then cooled and solidified, and the time during which the film- or sheet-like melt is maintained in the molten state is set within a specified range, porous membranes having better properties can be obtained without stretching the solidified film or sheet.

According to the present invention, there is provided a process for producing permeable membranes, which comprises mixing in the molten state (A) 90 to 30 parts by weight of at least one thermoplastic linear organic synthetic resin having stretchability with (B) 10 to 70 parts by weight of at least one compound having partial compatibility with the synthetic resin (A) and selected from the group consisting of synthetic polymers or oligomers containing at least 20 carbon atoms, natural organic polymeric compounds containing at least 20 carbon atoms, fatty acids containing at least 16 carbon atoms and esters or salts of the fatty acids, the total amount of components (A) and (B) being 100 parts by weight;

shaping the molten mixture into a film- or sheet-like melt having a thickness of 5 to 1000µ, passing the melt through a heated zone which is maintained at a temperature above the heat distortion temperatures of components (A) and (B), cooling and solidifying the melt and taking it up, the time from the shaping of the molten mixture into the film- or sheet-like melt to its cooling and solidification during which the melt is maintained in the molten state being adjusted to 10 to 600 seconds;

treating the resulting article with a solvent which is a poor solvent for component (A) and a good solvent for component (B); and drying the treated article.

In the process of this invention, the film-like or sheet-like melt can be passed through the heated zone while being laminated onto one of both surfaces of a porous sheet material having a thickness of 20µ to 2 mm, preferably 50µ to 500µ, and being substantially insoluble in the solvent used. Alternatively, a solid film or sheet may be first prepared from a mixture of components (A) and (B), and then laminated onto the porous sheet material while being heat-melted.

By this procedure, a multi-layer permeable membrane having the porous sheet material as a support layer can be obtained.

In the present application, the layer of the porous sheet material in the above laminate is termed a "support layer"; the layer of the molten mixture laminated on it, a "laminate layer"; and the laminate layer rendered porous by solvent treatment, a "microporous layer". Even when the permeable membrane does not contain the support layer, the porous film or sheet obtained by solvent treatment of the film or sheet prepared from the molten mixture of components (A) and (B) is referred to as a "microporous layer".

Mixing of components (A) and (B) in the molten state, as referred to in this application, means that components (A) and (B) are mixed at a temperature above the melting temperatures of these components but lower than their heat decomposition temperatures. The "melting temperature", as used herein, denotes the melting point of a crystalline compound or the glass transition point of an amorphous compound. The "heat decomposition temperature", as used herein, denotes a temperature at which the molecules of components (A)

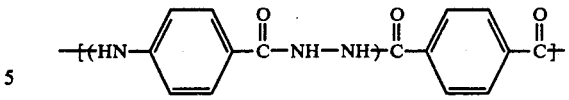

a polyamide containing a recurring unit of the following formula

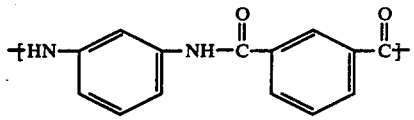

and a polyamide containing a recurring unit of the following formula

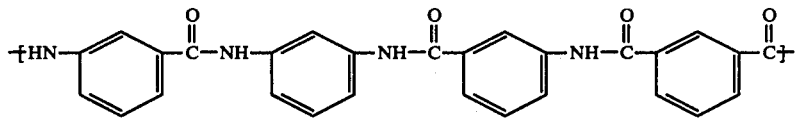

and (B) are cleaved by heat.

The permeable membrane in accordance with this invention can be obtained in the form of a flat film or sheet.

The synthetic resin component (A) used in the process of this invention is a thermoplastic linear organic synthetic resin which can be shaped into films, sheets or filaments which are stretchable. The synthetic resin (A) forms the main body of the permeable membrane in accordance with the invention.

Examples of preferred synthetic resins as component (A) include isotactic polypropylene having a melt index of 0.2 to 30; polypropylene modified with an unsaturated aliphatic carboxylic acid, for example, isotactic polypropylene modified with up to 10% by weight of maleic anhydride (to be referred to as maleinized polypropylene in the present application) or acrylic acid (to be referred to as acrylate-modified polypropylene in the present application); polypropylene modified with up to 20 % by weight of chlorine (to be referred to as chlorinated polypropylene in the present application); polypropylene modified with up to 10% by weight of sulfornic acid (to be referred to as sulfonated polypropylene in the present application); polyethylene having a melt index of 0.1 to 60 and a density of 0.91 to 0.97; polyethylene modified with an unsaturated aliphatic carboxylic acid, for example, polyethylene modified with up to 10% by weight of maleic anhydride (to be referred to as maleinized polyethylene in the present application) or acrylic acid (to be referred to as acrylate-modified polyethylene in the present application); polyethylene modified with up to 20% by weight of chlorine (to be referred to as chlorinated polyethylene in the present application); polyethylene modified with up to 10% by weight of sulfonic acid (to be referred to as sulfonated polyethylene in the present application); thermoplastic linear polyamides, for example, aliphatic polyamides or copolyamides with the alkylene group containing 1 to 20 carbon atoms such as nylon 6, nylon 66, nylon 11, nylon 12, nylon 6-9, nylon 6-10, nylon 6-12 and nylon 6-nylon 66 copolymer, and aromatic polyamides such as a polyamide containing a recurring unit of the formula (to be referred to as polyamides in the present application); thermoplastic linear polyesters, for example, polyalkylene terephthalates such as polyethylene terephthalate or polybutylene terephthalate, or copolyesters resulting from replacing up to about 20% of terephthalic acid in the polyalkylene terephthalates by another aliphatic or aromatic carboxylic acid such as isophthalic acid, sebacic acid adipic acid (to be referred to as linear polyesters in the present application); polystyrene having a melt index of 0.1 to 20; an ABS resin having a density of 1.0 to 1.2; a styrene/acrylonitrile copolymer containing 2 to 50% by weight of an acrylonitrile unit; polyvinyl chloride having an average degree of polymerization of 500 to 4,000; an ethylene/vinyl acetate copolymer having a melt index of 0.2 to 500 and containing 2 to 50% by weight of a vinyl acetate unit; an ethylene/acrylic acid copolymer containing 2 to 50% by weight of an acrylic acid unit; an ethylene/maleic acid copolymer containing 2 to 50% by weight of a maleic acid unit; a propylene/acrylic acid copolymer containing 2 to 50% by weight of an acrylic acid unit; a propylene/maleic acid copolymer containing 2 to 50% by weight of a maleic acid unit; atactic polypropylene having a melt index of 0.2 to 70; polyvinyl alcohol having a melt index of 0.1 to 400; polyvinyl acetate having a melt index of 0.2 to 100; a polyalkylene oxide having an average molecular weight of 100,000 to 10,000,000; poly(butene-1) having a melt index of 0.1 to 400; an ethylene/propylene copolymer containing 20 to 80% by weight of a propylene unit; and polymethyl methacrylate having a melt index of 0.2 to 20. Polyvinylidene fluoride, polycarbonate, polyacetal, polysulfone and cellulose acetate are also suitable.

Mixtures of at least two of the above-exemplified resins can also be used. The compound (B) used in the present invention is a component which is partly or wholly dissolved and removed from the film or sheet in the step of solvent treatment. Accordingly, the component (B) is either absent or partly present in the final permeable membrane in accordance with this invention.

Examples of preferred compounds as component (B) are those exemplified as component (A), either alone or in admixture, and additionally include rosin and dehydrogenated, hydrated or maleinized rosin; terpene resins; natural rubbers having a Mooney viscosity of 100 to 10; petroleum waxes such as paraffin wax or microcrystalline wax, and natural waxes containing about 20 to 60 carbon atoms such as carnauba wax; asphalt and gilsonite; synthetic waxes such as polyethylene-decomposed wax, waxy ethylene polymers, of Fischer-Tropsch wax; modified synthetic waxes such as maleinized wax obtained by modifying synthetic wax with up to 10% by weight of maleic anhydride, acrylate-modified wax obtained by modifying synthetic wax with up to 10% by weight of acrylic acid, chlorinated wax obtained by modifying synthetic wax with up to 20% by weight of chlorine, and sulfonated wax obtained by modifying wax with up to 10% by weight of sulfonic acid; chlorinated natural wax; resins prepared by thermal polymerization of petroleum resins or cyclopentadiene; maleinized petroleum resins obtained by modifying petroleum resins with maleic acid; hydrogenated petroleum resins; substantially unvulcanized synthetic rubbers having a Mooney viscosity of less than about 100, such as a styrene/butadiene rubber with a styrene content of 5 to 50% by weight, a nitrile rubber, a butadiene rubber, an isoprene rubber, a butyl rubber, a polychloroprene rubber, a polyisobutylene rubber, and an ethylene/propylene/diene terpolymer rubber having a propylene content of 20 to 70% by weight and a diene content of not more than 10% by weight; and polybutene having a melt index of 0.1 to 400 obtained by polymerizing a mixture of butene and butane in the presence of a Friedel-Crafts catalyst. Thermoplastic elastomers such as an α-methylstyrene/butadiene block copolymer or a styrene/butadiene block copolymer, and oligomers of these polymers can also be used.

It is important to choose any desired combination of components (A) and (B), but the choice should be such that component (A) is sparingly soluble in a solvent used in the solvent treatment step, and component (B) is readily soluble in the solvent. In addition, component (B) should be partly compatible with component (A).

In the present application, components (A) and (B) are partly compatible with each other when a sheet prepared from a molten mixture of the components (A) and (B) has a non-transparency on stretching, as measured by the method to be described, of not more than 80%, and a non-transparency on solvent-treatment, as measured by the method to be described, of at least 30%.

Preferably, the components (A) and (B) are selected so that the stretching non-transparency is not more than 50%, and the solvent treatment non-transparency is at least 50%.

NON-TRANSPARENCY ON STRETCHING

A 0.5 mm-thick sheet is prepared by mixing 60% by volume of component (A) and 40% by volume of component (B) in the molten state at a temperature above the melting temperatures of the components (A) and (B), press-forming the molten mixture for a pre-heating time of 10 minutes and an after-pressing time of 10 minutes by means of a hot press held at a temperature 20° to 40° C. higher than the melting temperature of component (A) or (B), whichever is higher, and then cooling the resulting sheet by water. The sheet prepared is set in a tenter biaxial stretcher in a constant-temperature tank in which the air is held at a temperature from a point lower than the melting temperature of the sheet to a point 20° C. below the melting temperature, and allowed to stand for 10 minutes. The sheet is biaxially stretched simultaneously at a stretch ratio of 3 in each of the longitudinal and transverse directions at a deformation speed of 600%/min. The non-transparency (%) of the resulting film is measured by the method of JIS P-8138-1963, and made the non-transparency on stretching.

NON-TRANSPARENCY ON SOLVENT TREATMENT

A 0.5 mm-thick sheet composed of 60% by volume of component (A) and 40% by volume of component (B) prepared in the same way as in the preparation of the sample for the measurement of the non-transparency on stretching is dipped for 30 minutes in a solvent which is a good solvent for component (B) but is a poor solvent for component (A), and then dried. The non-transparency (%) of the sheet is measured by the method of JIS P-8138-1963, and made the non-transparency on solvent treatment.

The above non-transparency on stretching shows that a clear phase separation does not occur in the interface between a phase of component (A) and a phase of component (B), and to some extent, their molecules are mutually dissolved. The non-transparency on solvent treatment shows that the molecules of components (A) and (B) are not completely mutually dissolved.

When the synthetic resin or compound dissolves in a concentration of at least 2% by weight in the solvent at the temperature of use, the solvent is a good solvent for the synthetic resin or compound (the synthetic resin or compound is readily soluble in the solvent). When it dissolves in the solvent in a concentration of less than 2% by weight, the synthetic resin or compound is sparingly soluble in the solvent and the solvent is a poor solvent for the synthetic resin or compound.

The above solubility can be evaluated by adding 2% by weight of the resin or compound in the form of granules, film, powder or liquid to the solvent at a predetermined solvent-treatment temperature, stirring the mixture sufficiently for 3 hours, and then determining whether it dissolves completely or not.

Examples of suitable combinations of components (A) and (B) and solvent in the present invention are shown in Table 1.

Table 1

| Component (A) | Component (B) | Solvent |
| --- | --- | --- |
| Isotactic polypropylene | Polyethylene | Xylene, toluene, tetrachloroethylene |
| | Ethylene/vinyl acetate copolymer | Xylene, toluene, tetrachloroethylene |
| | Ethylene/acrylic acid copolymer | Xylene, toluene, tetrachloroethylene |
| | Ethylene/propylene copolymer | Xylene, toluene, tetrachloroethylene |
| | Acrylate-modified polyethylene | |
| | Maleinized polyethylene | Xylene, toluene, tetrachloroethylene |
| | Chlorinated polyethylene | |

Table 1-continued

| Component (A) | Component (B) | Solvent |
|---|---|---|
| | Polyethylene oxide | Water, methanol |
| | Polystyrene | Toluene, butyl acetate, xylene, toluene, tetrachloroethylene |
| | Atactic polypropylene | Cyclohexane, decalin, benzene, toluene, xylene, tetrachloroethylene |
| | Poly(1-butene) | Ethylcyclohexane, toluene, xylene, tetrachloroethylene |
| | Wax | Xylene, toluene, tetrachloroethylene |
| | Polymethyl methacrylate | Xylene, toluene, tetrachloroethylene, acetone |
| | Polybutadiene | Xylene, toluene, tetrachloroethylene |
| | Styrene/butadiene copolymer rubber | Xylene, toluene, tetrachloroethylene |
| Isotactic polypropylene | Polyisobutylene | Xylene, toluene, tetrachloroethylene |
| | Polyisobutylene | Xylene, toluene, tetrachloroethylene |
| | Natural rubber | Xylene, toluene, tetrachloroethylene |
| | Isobutylene/isoprene copolymer rubber | Xylene, toluene, tetrachloroethylene |
| | Thermoplastic elastomers (e.g., α-methylstyrene/butadiene block copolymer, or styrene/butadiene block copolymer) | Xylene, toluene, tetrachloroethylene |
| | Petroleum resins | Xylene, toluene, tetrachloroethylene |
| Polyethylene | Ethylene/vinyl acetate copolymer | Xylene, toluene, tetrachloroethylene |
| | Ethylene/acrylic acid copolymer | Xylene, toluene, tetrachloroethylene |
| | Acrylate-modified polyethylene | Xylene, toluene, tetrachloroethylene |
| | Chlorinated polyethylene | Xylene, toluene, tetrachloroethylene |
| | Wax | Xylene, toluene, tetrachloroethylene |
| | Polystyrene | Butyl acetate, xylene, toluene, tetrachloroethylene |
| | Polymethyl methacrylate | Xylene, toluene, tetrachloroethylene, acetone |
| Polyethylene | Petroleum resins | Xylene, toluene, tetrachloroethylene |
| | Thermoplastic elastomers | Xylene, toluene, tetrachloroethylene |
| | Natural rubbers | Xylene, toluene, tetrachloroethylene |
| | Polybutadiene rubber | Xylene, toluene, tetrachloroethylene |
| | Styrene/butadiene copolymer | Xylene, toluene, tetrachloroethylene |
| | Polyisobutylene | Xylene, toluene, tetrachloroethylene, kerosene |
| | Isobutylene/isoprene copolymer | Xylene, toluene, tetrachloroethylene, kerosene |
| | Polyisoprene | Xylene, toluene, tetrachloroethylene, kerosene |
| Nylon 6, nylon 66, polyethylene terephthalate | Ethylene/acrylic acid copolymer | Xylene, toluene, tetrachloroethylene |
| | Ethylene/vinyl acetate copolymer | Xylene, toluene, tetrachloroethylene |
| | Polyvinyl acetate | Ethanol, n-butanol, isopropanol, acetone, ethyl acetate |
| | Polyethylene oxide | Water |
| Polyvinyl chloride | Polyvinyl acetate | Ethanol, n-butanol, isopropanol, acetone, ethyl acetate |
| | Polymethyl methacrylate | Acetone, xylene, toluene, tetrachloroethylene |
| | Polystyrene | Xylene, toluene, tetrachloroethylene, butyl acetate |
| | Ethylene/vinyl acetate copolymer | Xylene, toluene, tetrachloroethylene |

The amount of the component (A) is 90 to 30 parts by weight, and the amount of component (B) is 10 to 70 parts by weight, both per 100 parts by weight of the total of these components. If the amount of component (B) is less than 10 parts by weight, the desired continuous porous structure cannot be provided in the microporous layer of the porous membrane obtained. If it is larger than 70 parts by weight, the shape of the microporous layer cannot be maintained after solvent treatment. Preferably, the component (A) is used in an amount of 80 to 40 parts by weight, and the component (B) is an amount of 20 to 60 parts by weight.

The component (A) and the component (B) selected in accordance with the above standard are mixed in the molten state at a temperture higher than the melting temperatures of the components (A) and (B).

Mixing of the components (A) and (B) can be performed by any desired known means, for example by using an extruder, Banbury mixer, kneader or roller. It is essential that the components (A) and (B) should be melted at a temperature above the melting temperatures of these components, and mixed in this state. If the mixing is carried out while one of the components is not in the molten state, the partial mutual dissolution, as referred to in this invention, does not occur.

A film- or sheet-like melt without a support layer is prepared from the above-mentioned molten mixture by a method which comprises extruding the molten mixture through a die into a film or sheet form, and cooling and solidifying the film- or sheet-like melt while taking it up. It is important at this time to ensure that the extrudate, after leaving the die, will reach the frost line, namely the site where the extrudate is cooled and solidified, after a lapse of a sufficient period of time. This time is expressed by $$10 \text{ seconds} \leq (h/v) \leq 600 \text{ seconds},$$

preferably $$30 \text{ seconds} \leq (h/v) \leq 300 \text{ seconds}$$

most preferably $$60 \text{ seconds} \leq (h/v) \leq 200 \text{ seconds}$$

in which h is the distance in centimeters from the die exit to the frost line, and v is the take-up speed in centimeters per second of the extrudate.

In the present application, this time (h/v) is sometimes referred to as the "melt maintenance time".

The melt maintenance time depends upon the distance between the die exit and the frost line and the take-up speed of the extrudate. Usually, the melt extrudate is taken up at a speed of 0.1 to 100 cm/second, preferably 1 to 10 cm/second. The distance between the die exit and the frost line can be determined so that it will satisfy the melt maintenance time having regard to the take-up speed.

If the melt maintenance time is too short, it is impossible to obtain products having satisfactory permeability to gases, liquids, etc. If, on the other hand, it is too long, the sheet treated with a solvent has excessively large pore diameters, and the film-like melt that has left the die sags by its own weight (the draw-down phenomenon).

The most preferred method for producing film- or sheet-like articles without a support layer in this invention is to use an inflation molding machine. The accompanying drawing shows a schematic view of the method for producing a film-like melt using a molding machine of this type.

Referring to the accompanying drawing, a thermoplastic polymer as component (A) and a compound as component (B) in the required amounts are fed into an extruder 1 from a hopper 2. In the extruder, they are melted and mixed. The molten mixture is extruded upwardly through an annular die provided at a die heat 3, whereby a cylindrical molten mixture 4 is continuously formed. Introduction of a pressurized fluid into the cylinder causes the cylindrical molten mixture to expand in the diametrical direction of the cylindrical mixture, and the resulting expanded cylinder 5 moves upwardly in a heated tunnel 6. It is then cooled by cold air jetted from an annular nozzle (air ring) 10, and solidified by a frost line 7. The solidified product is flattened and taken up by a pair of take-up rolls 8, and wound up on a wind-up roll 9. The distance between the die exit and the frost line can be adjusted by changing the temperature and length of the heating tunnel. This leads to the adjustment of the melt maintenance time.

It is also possible to extrude the molten mixture into a sheet form from a T die.

These shaping steps are usually carried out as a continuous process from the step of melting and mixing the raw materials. If desired, however, they may be performed as separate steps.

In these shaping methods, the extrudate may also be taken up sideways or downwardly.

In any of the shaping methods exemplified above, it is necessary to provide a heating zone downstream of the die exit and to pass the molten shaped article through this zone. This can ensure the required distance from the die exit to the frost line in relation to the take-up speed.

The frost line need not always be achieved by forced cooling, and may be formed by spontaneous cooling. Furthermore, the frost line is not limited to the outside of the heating zone, and may be formed within the heating zone.

The frost line, in the case of spontaneous cooling, is determined by the temperature and length of the heating zone, the take-up speed and the solidifying temperature of the molten mixture, and its formation can be easily perceived by visual observation with the naked eye or by touching with fingers.

Usually, the heating zone is maintained at a temperature higher than room temperature, preferably at 80° to 350° C., and is provided such that the molten shaped article can pass through it and the melt maintenance time can be satisfied thereby.

The heating zone may, for example, be a tunnellike zone adapted to permit the passage of the molten shaped article through a tunnel, a flat plate-like zone adapted to permit the passage of the article along one or a plurality of flat surfaces, a roll-like zone adapted to permit the passage of the article over one or a plurality of rolls, or a belt-like zone adapted to permit the passage of the article over or along one or a plurality of moving belts.

The zones exemplified above can be maintained at the above-specified temperatures by various heating means such as electric heating, infrared heating, steam heating or hot air heating.

In these heated zones, the molten shaped article is heated by maintaining the framework itself of the heated zone in a heated condition, or providing a heat-generating source on the framework. It is also possible to introduce hot air or steam into the heating zone. Alternatively, the molten shaped article may be heated directly by using a heat-generating source such as a plurality of infrared heaters without providing a framework.

When the heating zone is tunnel-like or flat plate-like, it should be provided such that the molten shaped article will not contact its wall surfaces.

When the heating zone is roll-like, it is so provided that the molten shaped article will not be held by the clearance between rolls.

When the heating zone is belt-like, the molten shaped article may, for example, be held between two belts. In this case, the moving speeds of the belts should be made the same so as to avoid shearing deformation of the molten shaped article.

If desired, two or more of the heating zones of the types described above may be used in combination.

As stated hereinabove, the permeable membrane of this invention may be of a multilayer structure using a porous sheet material as a support layer. When in the process of this invention, a layer of a molten mixture of components (A) and (B) is laminated on one or both surfaces of a porous sheet material and, after being maintained in the molten state for a predetermined period of time, is treated with a solvent to form a microporous layer, the porous sheet material forms a support layer for the porous membrane. The porous sheet material supports the laminated layer of the molten mixture of components (A) and (B) while the mixture is maintained in the molten state for a predetermined period of time, and serves to prevent the deformation of the laminated layer when component (B) is removed from the laminated layer by solvent extraction. It also serves to impart dynamical properties such as strength and creep resistance to the resulting permeable membrane.

The porous sheet material is in the form of, for example, a nonwoven fabric, woven fabric, paper-like sheet or net, and is made of a polymer such as polyethylene, polypropylene, polystyrene, polyvinyl chloride, polyvinylidene chloride, polyethylene terephthalate, nylon 6 or nylon 66, a copolymer or blend consisting mainly of the above polymer, a synthetic fibrous material such as Vinylon (polyvinyl alcohol) fibers or polyacrylonitrile fibers, regenerated fibers such as rayon, natural organic fibers such as pulp, cotton, wool, silk or flax, inorganic fibers such as glass fibers, asbestos, or silica-alumina fibers, or metallic fibers such as stainless steel, copper or aluminum fibers. The porous sheet material of the invention also includes split cloths of thermoplastic resins, such as a split fiber net obtained by splitting a monoaxially stretched film of a thermoplastic resin parallel to the stretching direction and then tentering it in a direction at right angles to the stretching direction, and a laminated split fiber cloth obtained by laminating such split fiber nets in the longitudinal and lateral directions and bonding them. Plate-like materials having numerous open pores and made of a polymer, natural organic material, mineral or metal are also included within the definition of the porous sheet material used in this invention.

The porous sheet material has a thickness of 20 microns to 2 mm. If the thickness is less than 20 microns, the sheet material does not function sufficiently as a support. If the thickness exceeds 2 mm, the resulting porous membrane is too thick and becomes unsuitable for the intended uses.

Porous sheet materials of the above-exemplified types which contain numerous pores having an average pore diameter of 1 micron to 5 mm, preferably 10 microns to 2 mm, and being open from the surface to the back of the sheet material are usually employed. The average pore diameter is measured by a scanning electron microscopic method.

The porous sheet material should be insoluble, or only sparingly soluble, in the solvents used to remove component (B) of the laminated layer by solvent extraction.

Furthermore, it is preferred to select those porous sheet materials which have a heat distortion temperature higher than those of components (A) and (B).

In the process of this invention, the lamination of the molten mixture of components (A) and (B) on one or both surfaces of the porous sheet material can be performed by any of the following three procedures.

PROCEDURE (1)

The molten mixture is formed into a film- or sheet-like melt by a die or rolls, and superimposed on the porous sheet material while being maintained in the molten state. The laminate obtained is passed through the heated zone, cooled and solidified, and taken up.

PROCEDURE (2)

The molten mixture is formed into a film- or sheet-like melt by a die or rolls, and superimposed on the porous sheet material while being maintained in the molten state. It is compressed and melt-bonded to form a laminate. The laminate is passed through a heated zone, cooled and solidified, and taken up.

PROCEDURE (3)

A solid film or sheet prepared from the molten mixture by any desired method is superimposed on the porous sheet material, and heat-melted. It is compressed and melt-adhered by a roll to form a laminate. The laminate is passed through a heated zone, cooled and solidified, and taken up.

The time from the superimposing of the film- or sheet-like melt on the porous sheet material in procedure (1), the roll compressing of the film- or sheet-like melt superimposed on the porous sheet material in procedure (2), or the roll compressing of the heat-melted film or sheet in procedure (3) to the cooling and solidification of the melt is referred to respectively as the "melt maintenance time" in the present application. The required melt maintenance time, as in the case of not using a support layer, is 10 to 600 seconds, preferably 30 to 300 seconds, most preferably 60 to 200 seconds.

The lamination and melt-adhesion of the film- or sheet-like melt can be performed at a temperature below the heat distortion temperature of the porous sheet material.

The thickness of the laminated layer is adjusted to 5 to 1000 microns, preferably 5–200 microns. If the thickness is less than 5 microns, it is difficult to perform lamination uniformly, and pinholes tend to form. Moreover, in use, the microporous layer of the resulting porous membrane is susceptible to breakage. If the thickness of the laminated layer exceeds 1000 microns, the resultant product has poor permeability to gases and liquids.

The laminate is subsequently conducted to a heated zone in the same way as in the case of the film- or sheet-like melt having no support layer, and is maintained in the molten state for the required melt maintenance time.

The film or laminate (i.e., intermediate shaped article) obtained by the method described hereinabove is then treated with a solvent selected by the standards described hereinabove. The treatment can be performed either on one or both surfaces of the film according to the final desired product.

The solvent treatment can be performed by contacting the intermediate shaped article with the solvent at a predetermined temperature for a predetermined period of time.

The contacting of the intermediate article with the solvent is performed until 30 to 100% by weight, preferably 50 to 100% by weight, more preferably 80 to 100% by weight, of component (B) contained in the article is removed.

The treating temperature and time are not critical in particular. Suitable conditions are selected according to the combination of the components (A) and (B) and the solvent, and the desired characteristics of the final product. Generally, the intermediate shaped article is contacted for 10 seconds to 60 minutes with a solvent having a temperature of at least 10° C. and below the boiling point of the solvent.

Conveniently, the contacting of the intermediate shaped article with the solvent can be performed by a dipping method whereby the article is dipped for a predetermined period of time in the solvent held at a predetermined temperature, and then withdrawn. It can also be performed, for example, by continuously flowing or jetting the solvent onto the surface of the intermediate shaped article.

The article which has been subjected to the solvent treatment is then dried.

The method of drying is not critical in particular, and any known methods such as the blowing of air or a nitrogen gas, vacuum drying, or passing of the article through a drying chamber filled with hot air or hot nitrogen can be employed.

In order to increase the efficiency of drying, the solvent-treated article may be dipped, prior to drying, in a solvent which is well miscible with the extraction solvent and is readily evaporable (e.g., acetone or alcohols).

Sometimes, the sheet undergoes some deformation during dripping in the solvent. At such a time, it is preferred to dip the sheet in the taut state using rolls or a tenter, and then dry the sheet.

Thus, permeable membranes which have superior permeability to gases and liquids and a small pore diameter and are suitable for the intended uses can be obtained.

The permeable membrane without a support layer may be stretched by 50 to 1500% either monoaxially or biaxially. The stretching will provide products having far superior permeability to gases and liquids.

The stretching operation should be preformed on the dried products. The drying after the solvent treatment is carried out until the amount of the solvent adhering to or included in the film is reduced to below 50% by weight, usually to less than 10% by weight, based on the total weight of the film and the solvent.

If the product is stretched without prior drying, foaming occurs during the stretching step to form coarse bubbles which will deteriorate the properties of the final product or cause breakage of the product on stretching. Furthermore, when the product is stretched without prior drying while the remaining component (B) is in the swollen state, the porosity of the product does not so much increase, and its permeability to gases and liquids is not improved so much.

The monoaxial or biaxial stretching may be performed by various known methods, such as monoaxial stretching by rolls, restrained monoaxial stretching by rolls or a tenter, consecutive biaxial stretching consisting of longitudinal stretching by rolls and lateral stretching by a tenter, or simultaneous stretching by a tenter. What is required is to stretch the product monoaxially or biaxially by 50 to 1500%. If the amount of stretching is less than 50%, non-uniform stretching occurs. If the amount of stretching exceeds 1500%, the stretching is difficult. The preferred amount of stretching is 100 to 1000%.

In the case of biaxial stretching, the amounts of the longitudinal stretching and the lateral stretching may be the same or different.

The stretching temperature need not be particularly critical, and any temperature at which the stretching is possible suffices. Usually, the monoaxial stretching and the restrained monoaxial stretching are carried out at a temperature lower than the melting temperature of the film but above 0° C. The biaxial stretching is performed preferably at a temperature lower than the melting temperature of the film to a point 50° C. lower than the melting temperature.

It seems to be for the following reason that the process of this invention can afford superior permeable membranes.

The structure of a film or laminated layer of a mixture of components (A) and (B) is not a "sea-island" structure in which a phase of one component is dispersed in a matrix (continuous phase) of the other component, but it is presumed that components (A) and (B) are separated in a three-dimensional network structure while being dissolved mutually on their interface. In the molten shaped article as-extruded from the die, the size of the meshes of the three-dimensional network structure is not sufficiently large. When the shaped article in this condition is cooled and solidified and treated with a solvent to remove the component (B), a product having sufficient open pores and good permeability to gases and liquids cannot be obtained unless the shaped article is dried and then stretched. In contrast, if the shaped article in the molten state is allowed to stand for a sufficient period of the melt maintenance time specified in the present invention, the size of the meshes increases during this time. Consequently, the structure of the shaped article is set on cooling when the size has reached a suitable value. It is presumed that as a result, only the solvent-treatment of the shaped article to remove component (B) without stretching can afford a product which has sufficient open pores of suitable pore diameters and good premeability to gases and liquids.

The size of the pores of the porous membrane obtained by the process of this invention may be controlled by heat-treatment.

If desired, suitable amounts of additives such as fillers (e.g., calcium carbonate, silicon dioxide, titanium dioxide, clay, magnesium carbonate, barium sulfate, diatomaceous earth or calcium sulfate), fibrous materials (e.g., polyester fibers, nylon fibers or glass fibers), antioxidants, ultraviolet absorbers, and plasticizers may be added to components (A) and (B). Furthermore, the products in accordance with this invention may be treated with corona discharge, an oxidizing agent and a surface active agent.

The following Examples and Comparative Examples illustrate the present invention more specifically.

The properties of the permeable membranes in these examples were measured by the following methods.

AIR-PERMEATING TIME

The permeating time (in seconds) of 300 cc of air was measured by a Gurley's Densometer in accordance with JIS P-8117, and expressed in seconds per 300 cc air.

MAXIMUM PORE DIAMETER

Measured by British Standard 1752-1963.

EXAMPLE 1

Fifty parts by weight of isotactic polypropylene having a melt index of 2 and 50 parts by weight of an ethylene/vinyl acetate copolymer having a vinyl acetate content of 10% by weight were fed into an extruder of an inflation molding machine of the type shown in the accompanying drawing. The mixture was extruded from an annular die having an outside diameter of 4 cm and an inside diameter of 3.9 cm to form a cylindrical molten extrudate. Air was blown into the inside of the cylindrical extrudate to expand it to a cylindrical article having a diameter of 8.1 cm. It was passed through a heated tunnel, cooled and solidified by a nozzle for jetting cooled air, and taken up at a speed of 1 m/sec. to form a film-like intermediate article having a thickness of 0.25 mm. At this time, the temperature at the center of the extruder was 210° C., the temperature at the exit was 220° C., and the temperature of the die head was 230° C.

The heating tunnel was made of a cylindrical resistance heater having an inside diameter of 30 cm and a length of 15 cm, and the temperature of the inside of the tunnel was kept at 180° C. A frost line was formed at a position 20 cm above the nozzle outlet. A melt maintenance time of 20 seconds was secured.

The resulting intermediate film was dipped for 30 minutes in tetrachloroethylene held at 85° C., and then dried to form a film. The properties of the product are shown in Table 2.

COMPARATIVE EXAMPLE 1

A permeable film was prepared in the same way as in Example 1 except that the heating tunnel and the nozzle for jetting cooling air were not provided.

Since the heating tunnel was not provided, forced cooling was not performed. Despite this, the melt maintenance was as short as 8 seconds.

The properties of the product are shown in Table 2.

COMPARATIVE EXAMPLE 2

A permeable film was prepared in the same way as in Example 1 except that 50 parts by weight of isotactic polypropylene having a melt index of 2, 50 parts of polyvinyl chloride having an average degree of polymerization of 1100, 10 parts by weight of dioctyl phthalate and 1.5 parts by weight of dibutyltin maleate were used. The properties of the film are shown in Table 2.

COMPARATIVE EXAMPLE 3

An intermediate film was produced in the same way as in Example 1 except that 30 parts of polyethylene having a melt index of 0.5 and a density of 0.96 and 70 parts by weight of powdery calcium sulfite hemihydrate ($CaSO_3 \cdot \frac{1}{2}H_2O$) were used. The film was dipped for 60 minutes in 4N hydrochloric acid held at 60° C., washed with water, and dried to afford a permeable film. The properties of the final film product are shown in Table 2.

Table 2

| Run | Properties of the film products | | |
|---|---|---|---|
| | Tensile strength (longitudinal/tranverse; kg/cm$^2$) | Air-permeating time (sec/300 cc of air) | Maximum pore diameter (microns) |
| Example 1 | 260/245 | 1251 | 3.5 |
| Comparative Example 1 | 272/251 | 10000 (unmeasureable) | Unmeasureable |
| Comparative Example 2 | 115/103 | 10000 (unmeasurable) | Unmeasurable |
| Comparative Example 3 | 62/47 | 10000 (unmeasurable) | Unmeasurable |

It is seen from Table 2 that the air permeabilities of the film products are very unsatisfactory when the combination of compounds (A) and (B) having partial mutual solubility is used but the melt maintenance time is less than 20 seconds (Comparative Example 1), when the melt maintenance time is 20 seconds but components (A) and (B) do not have partial mutual solubility (Comparative Example 2), and also when one of the components is not melted at the time of the melt mixing operation (Comparative Example 3).

EXAMPLES 2 TO 13

Permeable film products were prepared in the same way as in Example 1 except using compositions having the constituents and proportions shown in Table 3 and the melt maintenance times and solvent-treatment conditions shown in Table 4. The properties of the films obtained are shown in Table 5. In these examples, the melt maintenance time was controlled by changing the length of the heating tunnel.

Table 3

| | Component (A) | | Component (B) | | Other component | |
|---|---|---|---|---|---|---|
| Example | Type | Parts by weight | Type | Parts by weight | Type | Parts by weight |
| 2 | Isotactic polypropylene (MI=7) | 30 | Polyethylene (density 0.0919; MI=0.3) | 70 | None | — |
| 3 | Polyvinyl chloride (average DP=1100) | 90 | Polyvinyl acetate | 10 | Dioctyl phthalate | 5 |
| | | | | | Dibutyltine maleate | 2.0 |
| 4 | Polyethylene terephthalate (obtained by melting Toray Tetoron fibers of 2 denier) | 80 | Ethylene/acrylic acid copolymer (acrylic acid content 20% by weight; MI=2) | 20 | None | — |
| 5 | Polyethylene (density 0.956; MI=0.8) | 40 | Polystyrene (MI=5) | 60 | None | — |
| 6 | Isotactic polypropylene (MI=3) | 55 | Ethylene/acrylic acid copolymer (acrylic acid content 10% by weight; MI=25) | 45 | None | — |
| 7 | Isotactic polypropylene (MI=5) | 45 | Polystyrene (MI=10) | 55 | None | — |
| 8 | Isotactic polypropylene | 60 | Petroleum resin | 40 | None | — |

Table 3-continued

| Ex- ample | Component (A) Type | Parts by weight | Component (B) Type | Parts by weight | Other component Type | Parts by weight |
|---|---|---|---|---|---|---|
| | (MI=2) | | (Nisseki Neopolymer 140) | | | |
| 9 | Isotactic polypropylene (MI=9) | 50 | Polymethyl methacrylate (Sumipex LO, a product of Sumitomo Chemical Co., Ltd.) | 50 | None | — |
| 10 | Isotactic polypropylene (MI=12) | 50 | Liquid poly(1-butene) (average molecular weight 1900) | 50 | None | — |
| 11 | Isotactic polypropylene (MI=30) | 50 | Isobutylene/isoprene copolymer rubber (Esso, E-035) | 50 | None | — |
| 12 | Isotactic polypropylene (MI=3) | 50 | Polyisobutylene (Esso, Vistanex L-120) | 50 | None | — |
| 13 | Polyethylene (density 0.960; MI=6.0) | 50 | Polymethyl methacrylate (Sumipex LO) | 50 | None | — |

Table 4

| | Sheet | | Solvent treatment | | |
|---|---|---|---|---|---|
| Example | Melt maintenance time (seconds) | Thickness (mm) | Solvent | Temperature (°C.) | Time (minutes) |
| 2 | 600 | 0.16 | Tetrachloroethylene | 85 | 20 |
| 3 | 45 | 0.74 | Ethyl acetate | 70 | 30 |
| 4 | 62 | 0.24 | Mixed xylenes | 85 | 10 |
| 5 | 296 | 0.05 | n-Butyl acetate | 100 | 5 |
| 6 | 124 | 0.49 | Toluene | 80 | 60 |
| 7 | 182 | 0.12 | Tetrachloroethylene | 70 | 15 |
| 8 | 245 | 0.08 | Tetrachloroethylene | 80 | 3 |
| 9 | 296 | 0.15 | Acetone | 30 | 20 |
| 10 | 367 | 0.22 | Tetrachloroethylene | 80 | 30 |
| 11 | 432 | 0.36 | Tetrachloroethylene | 85 | 25 |
| 12 | 531 | 0.19 | Tetrachloroethylene | 85 | 20 |
| 13 | 97 | 0.29 | Acetone | 30 | 30 |

Table 5

| | Properties of the product films | | |
|---|---|---|---|
| Ex- ample | Tensile strength (machine/transverse; kg/cm$^2$) | Air-permeating time (sec/300 cc of air) | Maximum pore diameter ($\mu$) |
| 2 | 214/186 | 25 | 12 |
| 3 | 375/297 | 1764 | 4.2 |
| 4 | 480/365 | 276 | 0.2 |
| 5 | 231/194 | 137 | 0.1 |
| 6 | 298/243 | 118 | 0.1 |
| 7 | 246/229 | 93 | 0.2 |
| 8 | 307/241 | 87 | 0.3 |
| 9 | 254/216 | 72 | 0.5 |
| 10 | 236/207 | 124 | 1.7 |
| 11 | 273/214 | 137 | 2.2 |
| 12 | 289/253 | 94 | 3.5 |
| 13 | 215/186 | 86 | 0.3 |

It is seen from Table 5 that the product films in accordance with the process of this invention had good quality with a good balance between the air-permeating time and the maximum pore diameter, and that the products obtained in Examples 4 to 9 in which the melt maintenance time was adjusted to 1 to 5 minutes exhibited an especially good balance between the air-permeating time and the maximum pore diameter.

EXAMPLES 14 TO 19

The solvent-treated sheets obtained in Examples 1 to 4 to 8 were each stretched by the methods and under the conditions indicated in Table 6. The properties of the stretched films are shown in Table 6.

Table 6

| | | Stretching | | | Properties of the stretched films | |
|---|---|---|---|---|---|---|
| Ex- ample | Solvent- treated sheet | Method | Temperature (°C.) | Amount of stretching (%) | Air-permeating time (sec/100 cc of air) | Maximum pore diameter (microns) |
| 14 | Sheet of Example 1 | Monoaxial, by rolls | 142 | 350 | 75 | 0.7 |
| 15 | Sheet of Example 4 | Biaxial, by a tenter | 260 | 50 (machine) 50 (transverse) | 86 | 0.9 |
| 16 | Sheet of Example 5 | Monoaxial, by rolls | 125 | 1500 | 3 | 0.6 |
| 17 | Sheet of Example 6 | Longitudinal stretching by rolls and transverse stretching by a tenter | 155 / 165 | 300 (machine) 400 (transverse) | 7 | 0.8 |
| 18 | Sheet of | Monoaxial, by rolls | 130 | 50 | 12 | 0.3 |

Table 6-continued

| Example | Solvent-treated sheet | Stretching | | | Properties of the stretched films | |
|---|---|---|---|---|---|---|
| | | Method | Temperature (°C.) | Amount of stretching (%) | Air-permeating time (sec/100 cc of air) | Maximum pore diameter (microns) |
| 19 | Example 7 Sheet of Example 8 | Restrained mono-axial, by rolls | 140 | 150 | 6 | 0.7 |

It is seen from Table 6 that stretching can afford products having a markedly reduced air-permeating time, a very good air-permeability and a good balance between the air-permeating time and the maximum pore diameter.

COMPARATIVE EXAMPLES 4 TO 6

Laminating compositions were prepared by melt mixing the ingredients shown in Table 7 in accordance with the recipes shown in Table 7. Using these compositions, the laminated sheets shown in Table 8 were prepared. The melt maintenance times indicated in Table 8 were secured by passing the laminated sheets through a heated zone, and then the laminated sheets were cooled and solidified. The cooled products were solvent-treated under the conditions shown in Table 8 and dried.

The properties of the products are shown in Table 9.

It is seen from Table 9 that the air-permeabilities of the products were extremely unsatisfactory when the combination of components (A) and (B) having partial mutual solubility was used but the melt maintenance time was shorter than 10 seconds. (Comparative Example 4), when the melt maintenance time was more than 10 seconds but the components (A) and (B) did not have partial mutual solubility (Comparative Example 5), and when one of the components was not melted in the melt-mixing operation (Comparative Example 6).

EXAMPLES 20 TO 32

Laminating compositions were prepared by meltmixing the ingredients shown in Table 7 at a temperature above the melting temperatures of the components (A) and (B) in accordance with the recipes shown in Table 7. Using the compositions, the laminated sheets shown in Table 8 were produced. The melt maintenance times shown in Table 8 were secured by passing the laminated sheets through a heated zone, and then the products were cooled, and solidified. The solidified products were solvent-treated as shown in Table 8, and dried to afford permeable membranes. The properties of the permeable membranes are shown in Table 9.

Table 9 shows that permeable membranes having excellent quality can be obtained by the process of this invention. Specifically, Example 20 was performed under the same conditions as in Comparative Example 4 except that the melt maintenance time was changed to 10 seconds. As a result of this change, a permeable membrane having good air-permeability was obtained.

Examples 23 to 32 show more preferred examples in which the proportion of component (A) in the laminating composition was 80 to 40% by weight, and the melt maintenance time was 30 seconds to 300 seconds. In these examples, products having a small maximum pore diameter and very good air-permeability were obtained.

Table 7

| Example (Ex.) or Comparative Example (CE.) | Component (A) | | Component (B) | | Other component | |
|---|---|---|---|---|---|---|
| | Type | Parts by weight | Type | Parts by weight | Type | Parts by weight |
| CE. 4 | Isotactic polypropylene | 50 | Ethylene/vinyl acetate copolymer (vinyl acetate) content, 20% by weight; MI=20 | 50 | None | — |
| CE. 5 | Isotactic polypropylene (MI=2) | 50 | Polyvinyl chloride (average DP=1100) | 50 | Dioctyl phthalate (plasticizer) | 10 |
| | | | | | Dibutyltin maleate (stabilizer) | 1.5 |
| CE. 6 | Polyethylene (density 0.96; MI=0.5) | 30 | Calcium sulfite hemihydrate (CaSO$_3$ . ½H$_2$O) | 70 | None | — |
| Ex. 20 | Isotactic polypropylene (MI=2) | 50 | Ethylene/vinyl acetate coplymer (vinyl acetate content, 20% by weight; MI=20 | 50 | None | — |
| Ex. 21 | Isotactic polypropylene (MI=7) | 30 | Polyethylene (density 0.919; MI=0.3) | 70 | None | — |
| Ex. 22 | Polyvinyl chloride (average DP=1100) | 90 | Polyvinyl acetate | 10 | Dioctyl phthalate | 5 |
| | | | | | Dibutyltin maleate | 2.0 |

| Example | Component (A) | | Component (B) | | Other component | |
|---|---|---|---|---|---|---|
| | Type | Parts by weight | Type | Parts by weight | Type | Parts by weight |
| 23 | Polyethylene terephthalate (Toray Tetoron fibers of 2-denier, melted) | 80 | Ethylene/acrylic acid copolymer (acrylic acid content 20% by weight; MI=8) | 20 | None | — |

Table 7-continued

| | | | | | | |
|---|---|---|---|---|---|---|
| 24 | Polyethylene (density 0.956, MI=0.3) | 40 | Polystyrene (MI=5) | 60 | None | — |
| 25 | Isotactic polypropylene (MI=0.3) | 55 | Ethylene/acrylic acid copolymer (acrylic acid content 10% by weight; MI=25) | 45 | None | — |
| 26 | Isotactic polypropylene (MI=0.3) | 45 | Polystyrene (MI=10) | 55 | None | — |
| 27 | Isotactic polypropylene (MI=2) | 60 | Petroleum resin (Nisseki Neopolymer 140) | 40 | None | — |
| 28 | Isotactic polypropylene (MI=9) | 50 | Polymethyl methacrylate (Sumipex LO, a product of Sumitomo Chemical Co., Ltd.) | 50 | None | — |
| 29 | Isotactic polypropylene (MI=12) | 50 | Liquid poly(1-butene) (average molecular weight 1900) | 50 | None | — |
| 30 | Isotactic polypropylene (MI=30) | 50 | Isobutylene/isoprene copolymer rubber (Esso, E-035) | 50 | None | — |
| 31 | Isotactic polypropylene (MI=3) | 50 | Polyisobutylene (Esso, Vistanex L-120) | 50 | None | — |
| 32 | Polyethylene (density 0.960; MI=6.0) | 50 | Polymethyl methacrylate (Sumitomo, Sumipex LO) | 50 | None | — |

Table 8

| Example (Ex.) or Comparative Example (CE.) | Laminated sheet Porous sheet material as a support layer (the parenthesized figures show average pore diameters) | Thickness of the sheet (mm) | Thickness of the laminate (mm) | Procedure of lamination | Melt maintenance time (sec.) | Solvent treatment Solvent | Temperature (°C.) | Time (minutes) |
|---|---|---|---|---|---|---|---|---|
| CE. 4 | Polyethylene terephthalate nonwoven fabric (150 μ) | 0.08 | 0.02 (both surfaces) | (2) | 7 | Tetrachloroethylene | 85 | 30 |
| CE. 5 | Nylon 66 nonwoven fabric (1 μ) | 0.02 | 0.03 (both surfaces) | (2) | 62 | Cyclohexane | 80 | 30 |
| CE. 6 | Glass fiber nonwoven fabric (300 μ) | 2 | 0.03 (both surfaces) | (2) | 75 | 4N hydrochloric acid | 60 | 60 |
| Ex. 20 | Polyethylene terephthalate nonwoven fabric (150 μ) | 0.08 | 0.02 (both surfaces) | (2) | 10 | Tetrachloroethylene | 85 | 30 |
| Ex. 21 | Nylon 66 nonwoven fabric (1 μ) | 0.02 | 0.005 (both surfaces) | (2) | 20 | Tetrachloroethylene | 85 | 1 |
| Ex. 22 | Glass fiber nonwoven fabric (300 μ) | 2 | 0.08 (one surface) | (2) | 600 | Ethyl acetate | 70 | 30 |
| Ex. 23 | Stainless steel wire gauze (5 mm) | 0.20 | 0.20 (one surface) | (3) | 297 | Mixed xylenes | 85 | 10 |

| Example | Laminated sheet Porous sheet material as a support layer (the parenthesized figures show average pore diameters) | Thickness of the support (mm) | Thickness of the laminate (mm) | Procedure of lamination | Melt maintenance time (sec.) | Solvent treatment Solvent | Temperature (°C.) | time (minutes) |
|---|---|---|---|---|---|---|---|---|
| 24 | Rayon sheet (10 μ) | 0.12 | 0.04 (both surfaces) | (1) | 32 | n-Butyl acetate | 100 | 5 |
| 25 | Cotton mesh (2 mm) | 0.25 | 0.02 (both surfaces) | (3) | 265 | Toluene | 80 | 60 |
| 26 | Pulp paper (200 μ) | 0.08 | 0.01 (both surfaces) | (2) | 64 | Tetrachloroethylene | 70 | 15 |
| 27 | Polyethylene terephthalate woven fabric (500 μ) | 0.35 | 0.08 (both surfaces) | (1) | 242 | Tetrachloroethylene | 80 | 3 |
| 28 | Polyethylene pulp synthetic paper-like sheet (25 μ) | 0.10 | 0.02 (one surface) | (2) | 121 | Acetone | 30 | 20 |
| 29 | Stainless steel wire gauze (100 μ) | 0.06 | 0.02 (both surfaces) | (2) | 185 | Tetrachloroethylene | 80 | 30 |
| 30 | Open-cellular case plate | 0.2 | 0.05 (both surfaces) | (1) | 40 | Tetrachloroethylene | 85 | 25 |

Table 8-continued

| | | | | | | | | |
|---|---|---|---|---|---|---|---|---|
| 31 | Polyethylene terephthalate split fiber cloth (2 mm) | 0.04 | 0.02 (both surfaces) | (2) | 75 | Tetrachloroethylene | 85 | 20 |
| 32 | Woven fabric made of Vinylon fibers (500 μ) | 0.5 | 0.03 (both surfaces) | (3) | 118 | Acetone | 30 | 30 |

Table 9

| Example (Ex.) or Comparative Example (CE.) | Properties of the permeable membrane products | |
|---|---|---|
| | Air-permeating time (sec/100 cc of air) | Maximum pore diameter (μ) |
| CE. 4 | More than 10000 (unmeasurable) | unmeasurable |
| CE. 5 | More than 10000 (unmeasurable) | Unmeasurable |
| CE. 6 | More than 10000 (unmeasurable) | Unmeasurable |
| Ex. 20 | 875 | 3.2 |
| Ex. 21 | 417 | 3.5 |
| Ex. 22 | 964 | 5.3 |
| Ex. 23 | 196 | 0.9 |
| Ex. 24 | 86 | 0.7 |
| Ex. 25 | 62 | 0.8 |
| Ex. 26 | 31 | 0.3 |
| Ex. 27 | 75 | 0.5 |
| Ex. 28 | 17 | 0.4 |
| Ex. 29 | 29 | 0.5 |
| Ex. 30 | 65 | 0.2 |
| Ex. 31 | 14 | 0.6 |
| Ex. 32 | 31 | 0.4 |

What we claim is:

1. A process for producing a permeable membrane, which comprises mixing in the molten state (A) 90 to 30 parts by weight of at least one thermoplastic linear organic synthetic resin having stretchability with (B) 10 to 70 parts by weight of at least one compound having partial compatibility with the synthetic resin (A) and selected from the group consisting of synthetic polymers or oligomers containing at least 20 carbon atoms, natural organic polymeric compounds containing at least 20 carbon atoms, fatty acids containing at least 16 carbon atoms and esters or salts of the fatty acids, the total amount of components (A) and (B) being 100 parts by weight;

shaping the molten mixture into a film- or sheet-like melt having a thickness of 5 to 1000μ by extruding the molten mixture through a die, passing the melt through a heated zone which is maintained at a temperature above the heat distortion temperatures of components (A) and (B), cooling and solidifying the melt and taking it up under such conditions that the distance (h) in centimeters from the die exit to the frost line of the melt and the take-up speed (v) in centimeters per second satisfy the following relation:

10 seconds ≦ (h/v) ≦ 600 seconds, wherein (h/v) is a melt maintenance time;

treating the resulting article with a solvent which is a poor solvent for component (A) and a good solvent for component (B), to remove 30 to 100% by weight of component (B) contained in the article; and drying the treated article to a solvent content of less than 10% by weight based on the total weight of the article and solvent, with the proviso that the article is not stretched between the solvent treatment step and the drying step.

2. The process of claim 1 wherein prior to passing through the heated zone, the film- or sheet-like melt having a thickness of 5 to 200μ is laminated on one or both surfaces of a porous sheet material which will withstand the temperature in the heated zone and has a thickness of 20μ to 2 mm and is insoluble or only sparingly soluble in the solvent, the lamination being performed at a temperature below the heat distortion temperature of the porous sheet material.

3. The process of claim 1 wherein the molten mixture of components (A) and (B) is extruded through the die into a film- or sheet-like melt, and the melt is passed through a heated zone provided downstream of the die, cooled and solidified, and taken up.

4. The process of claim 1 wherein, subsequent to the drying step, the dried article is stretched.

5. The process of claim 2 wherein components (A) and (B) are melt-mixed at a temperature above their melting temperatures, and a solid film or sheet is prepared from the molten mixture, heated to a temperature below the heat distortion temperature of the porous sheet material, and laminated onto the porous sheet material.

6. The process of claim 4 wherein the dried article is stretched monoaxially or biaxially by 50 to 1500%.

7. The process of claim 6 wherein the stretching of the dried article is carried out at a temperature lower than the melting temperature of the dried article but above 0° C. in one direction either in the free state or while restraining the shrinkage of the dried article in the other direction.

8. The process of claim 6 wherein the stretching of the dried article is carried out biaxially at a temperature below the melting temperature of the article but not below a temperature 50° C. lower than the melting temperature.

9. The process of claim 1 wherein components (A) and (B) are selected from the group consisting of (1) component (A) selected from isotactic polypropylene, maleinized polypropylene, acrylate-modified polypropylene, chlorinated polypropylene, and sulfonated polypropylene, and component (B) selected from polyethylene, polyethylene oxide, an ethylene/vinyl acetate copolymer, an ethylene/acrylic acid copolymer, an ethylene/maleic acid copolymer, polystyrene, atactic polypropylene, nylon 6, poly(butene-1), wax, an ethylene/propylene copolymer, a styrene/butadiene copolymer, natural rubber, polybutadiene rubber, polyisoprene rubber, an isobutylene/isoprene copolymer rubber, polyisobutylene, polyvinyl alcohol, maleinized polyethylene, acrylate-modified polyethylene, chlorinated polyethylene, sulfonated polyethylene, and polymethyl methacrylate;

(2) component (A) isotactic polypropylene, and component (B) is selected from maleinized polypropylene, acrylate-modified polypropylene, chlorinated polypropylene, sulfonated polypropylene, a propylene/acrylic acid copolymer, and a propylene/maleic acid copolymer;

(3) component (A) selected from polyethylene, maleinized polyethylene, acrylate-modified polyethylene, chlorinated polyethylene and sulfonated polyethylene, and component (B) selected from an ethylene/vinyl acetate copolymer, wax, atactic polypropylene, an ethylene/acrylic acid copolymer, nylon 6, nylon 66, polystyrene, poly(butene-1), polyethylene oxide, an ethylene/propylene copolymer, an ethylene/maleic acid copolymer, polyvinyl alcohol, a styrene/butadiene copolymer, natural rubber, polybutadiene rubber, polyisoprene rubber, an isobutylene/isoprene copolymer rubber, polyisobutylene, a propylene/acrylic acid copolymer, a propylene/maleic acid copolymer and polymethyl methacrylate;

(4) component (A) selected from polyamides and linear polyesters, and component (B) selected from polyethylene, polyethylene oxide, an ethylene/vinyl acetate copolymer, an ethylene/acrylic acid copolymer, polystyrene, wax, poly(butene-1), isotactic polypropylene, atactic polypropylene, polyvinyl alcohol, polyvinyl acetate, an ethylene/maleic acid copolymer, a propylene/acrylic acid copolymer, a propylene/maleic acid copolymer, maleinized polyethylene, acrylate-modified polypropylene, chlorinated polypropylene, sulfonated polypropylene, maleinized polyethylene, acrylate-modified polyethylene, chlorinated polyethylene, sulfonated polyethylene, polyvinyl chloride and polymethyl methacrylate;

(5) component (A) nylon 66 and component (B) nylon 6, or component (A) a linear polyester and component (B) selected from nylon 6 and nylon 66;

(6) component (A) selected from polystyrene, an ABS resin, an acrylonitrile/styrene copolymer and a styrene/divinylbenzene copolymer, and component (B) selected from a styrene/butadiene copolymer, natural rubber, polybutadiene rubber, polyisoprene rubber, an isobutylene/isoprene copolymer rubber, polyisobutylene, polymethyl methacrylate, polyvinyl acetate, polyethylene oxide, polyvinyl alcohol, atactic polypropylene and polyvinyl chloride; and (7) component (A) polyvinyl chloride, and component (B) selected from polyvinyl acetate, polymethyl methacrylate, polystyrene, an ethylene/vinyl acetate copolymer, an ethylene/acrylic acid copolymer, an ethylene/maleic acid copolymer, a propylene/acrylic acid copolymer, a propylene/maleic acid copolymer, maleinized polyethylene, acrylate-modified polyethylene, chlorinated polyethylene, sulfonated polyethylene, maleinized polypropylene, acrylate-modified polypropylene, chlorinated polypropylene, sulfonated polypropylene, polyethylene oxide, polyvinyl alcohol, polychloroprene, and a butadiene/acrylonitrile copolymer.

10. The process of claim 1 wherein the solvent treatment is carried out until 30 to 100% by weight of the component (B) in the shaped article is removed.

11. The process of claim 4 wherein the molten mixture of components (A) and (B) is extruded through the die into a film- or sheet-like melt, and the melt is passed through a heated zone provided downstream of the die, cooled and solidified, and taken up.

12. The process of claim 4 wherein components (A) and (B) are melt-mixed at a temperature above their melting temperatures, and a solid film or sheet is prepared from the molten mixture, heated to a temperature below the heat distortion temperature of the porous sheet material, and laminated onto the porous sheet material.

13. The process of claim 4 wherein components (A) and (B) are selected from the group consisting of (1) component (A) selected from isotactic polypropylene, maleinized polypropylene, acrylate-modified polypropylene, chlorinated polypropylene, and sulfonated polypropylene, and component (B) selected from polyethylene, polyethylene oxide, an ethylene/vinyl acetate copolymer, an ethylene/acrylic acid copolymer, an ethylene/maleic acid copolymer, polystyrene, atactic polypropylene, nylon 6, poly(butene-1), wax, an ethylene/propylene copolymer, a styrene/butadiene copolymer, natural rubber, polybutadiene rubber, polyisoprene rubber, an isobutylene/isoprene copolymer rubber, polyisobutylene, polyvinyl alcohol, maleinized polyethylene, acrylate-modified polyethylene, chlorinated polyethylene, sulfonated polyethylene, and polymethyl methacrylate;

(2) component (A) isotactic polypropylene, and component (B) selected from maleinized polypropylene, acrylate-modified polypropylene, chlorinated polypropylene, sulfonated polypropylene, a propylene/acrylic acid copolymer, and a propylene/maleic acid copolymer;

(3) component (A) selected from polyethylene, maleinized polyethylene, acrylate-modified polyethylene, chlorinated polyethylene and sulfonated polyethylene, and component (B) selected from an ethylene/vinyl acetate copolymer, wax, atactic polypropylene, an ethylene/acrylic acid copolymer, nylon 6, nylon 66, polystyrene, poly(butene-1), polyethylene oxide, an ethylene/propylene copolymer, an ethylene/maleic acid copolymer, polyvinyl alcohol, a styrene/butadiene copolymer, natural rubber, polybutadiene rubber, polyisoprene rubber, an isobutylene/isoprene copolymer rubber, polyisobutylene, a propylene/acrylic acid copolymer, a propylene/maleic acid copolymer and polymethyl methacrylate;

(4) component (A) selected from polyamides and linear polyesters, and component (B) selected from polyethylene, polyethylene oxide, an ethylene/vinyl acetate copolymer, an ethylene/acrylic acid copolymer, polystyrene, wax, poly(butene-1), isotactic polypropylene, atactic polypropylene, polyvinyl alcohol, polyvinyl acetate, an ethylene/maleic acid copolymer, a propylene/acrylic acid copolymer, a propylene/maleic acid copolymer, maleinized polypropylene, acrylate-modified polypropylene, chlorinated polypropylene, sulfonated polypropylene, maleinized polyethylene, acrylate-modified polyethylene, chlorinated polyethylene, sulfonated polyethylene, polyvinyl chloride and polymethyl methacrylate;

(5) component (A) nylon 66 and component (B) nylon 6, or component (A) a linear polyester and component (B) selected from nylon 6 and nylon 66;

(6) component (A) selected from polystyrene, an ABS resin, an acrylonitrile/styrene copolymer and a styrene/divinylbenzene copolymer, and component (B) selected from a styrene/butadiene copolymer, natural rubber, polybutadiene rubber, polyisoprene rubber, an isobutylene/isoprene copolymer rubber, polyisobutylene, polymethyl methacrylate, polyvinyl acetate, polyethylene oxide, polyvinyl alcohol, atactic polypropylene and polyvinyl chloride; and (7) component (A) polyvinyl chloride, and component (B) selected from polyvinyl acetate, polymethyl methacrylate, polystyrene, an ethylene/vinyl acetate copolymer, an ethylene/acrylic acid copolymer, an ethylene/maleic acid copolymer, a propylene/acrylic acid copolymer, a propylene/maleic acid copolymer, maleinized polyethylene, acrylate-modified polyethylene, chlorinated polyethylene, sulfonated polyethylene, maleinized polypropylene, acrylate-modified polypropylene, chlorinated polypropylene, sulfonated polypropylene, polyethylene oxide, polyvinyl alcohol, polychloroprene, and a butadiene/acrylonitrile copolymer.

14. The process of claim 4 wherein the solvent treatment is carried out until 50 to 100% by weight of the component (B) in the shaped article is removed.

15. The process of claim 4 wherein prior to passing through the heated zone, the film- or sheet-like melt having a thickness of 5 to 200µ is laminated on one or both surfaces of a porous sheet material which will withstand the temperature in the heated zone and has a thickness of 20µ to 2 mm and is insoluble or only sparingly soluble in the solvent, the lamination being performed at a temperature below the heat distortion temperature of the porous sheet material.

* * * * *